No. 864,904.  
A. J. MORSE.  
TRANSMISSION GEARING.  
APPLICATION FILED FEB. 19, 1906.
PATENTED SEPT. 3, 1907.
2 SHEETS—SHEET 1.
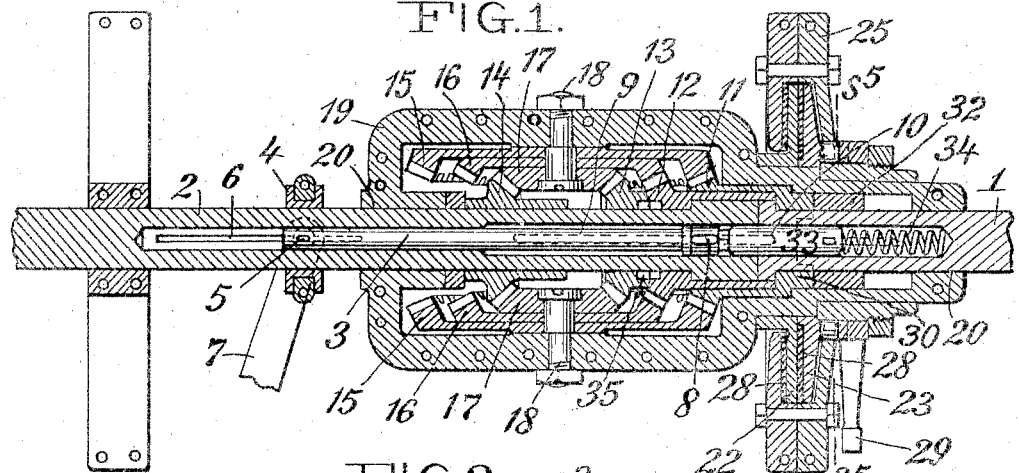
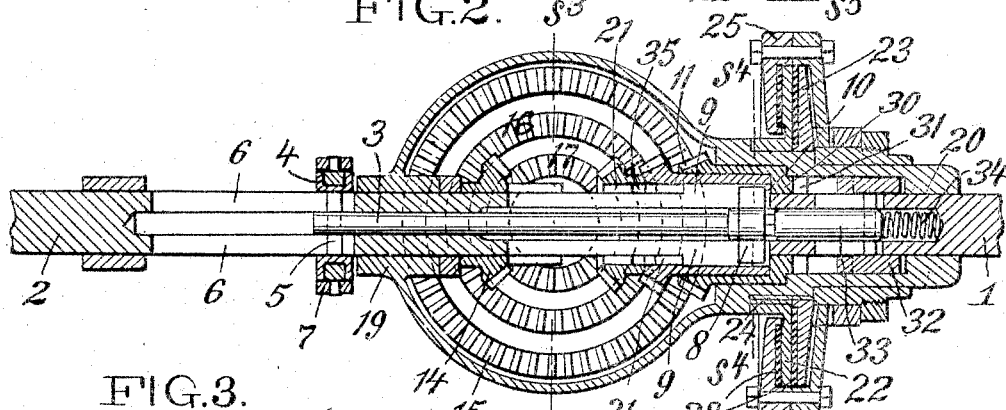
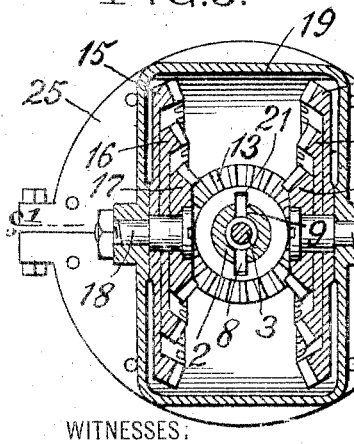
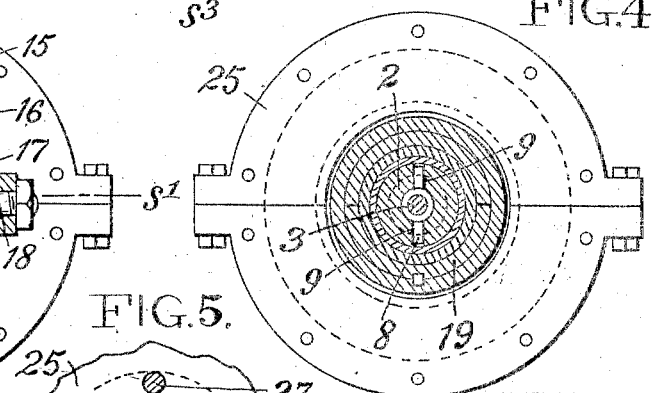
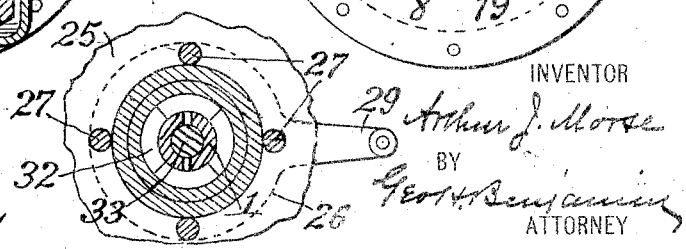
WITNESSES:  
Frank O'Connor  
W. H. Pumphrey
INVENTOR  
Arthur J. Morse  
BY Geo. H. Benjamin  
ATTORNEY

UNITED STATES PATENT OFFICE.

ARTHUR JACOB MORSE, OF TORRINGTON, CONNECTICUT, ASSIGNOR OF ONE-HALF TO ADELBERT P. HINE, OF TORRINGTON, CONNECTICUT.

TRANSMISSION-GEARING.

No. 864,904.      Specification of Letters Patent.      Patented Sept. 3, 1907.

Application filed February 19, 1906. Serial No. 301,860.

*To all whom it may concern:*

Be it known that I, ARTHUR JACOB MORSE, a citizen of the United States, residing at Torrington, county of Litchfield, State of Connecticut, have invented certain new and useful Improvements in Transmission-Gearing, of which the following is a specification.

My invention relates to transmission gearing of the changeable speed class, and, as herein embodied, is adapted particularly for use in connecting driving and driven shafts, as in motor vehicles, for example,—where complete control and regulation of the power transmitted is desired without varying the speed of the motor.

In a prior application serially numbered 290,662, filed December 6, 1905, I have described transmission gearing of the same general character as that herein shown but the arrangement of the mechanism is such, that high speed transmission is necessarily accompanied by rotation of the gear casing. This I find to be objectionable, as the momentum acquired by such a heavy body when rotating at high speed, is ordinarily sufficient, if suddenly checked by the gears becoming obstructed or locked, to strip, fracture or otherwise injure the same and to avoid such an accident, provision is herein made for effecting high speed transmission without motion of the gear case.

Various other features of the present invention will be hereinafter referred to.

The accompanying drawings will serve to illustrate mechanism suitable for carrying my invention into effect.

Figure 6:
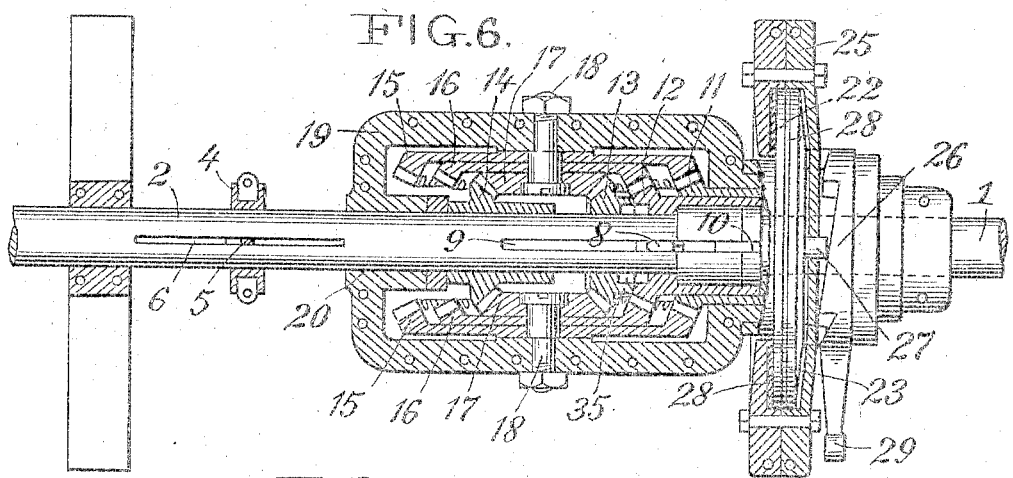
Figure 7:
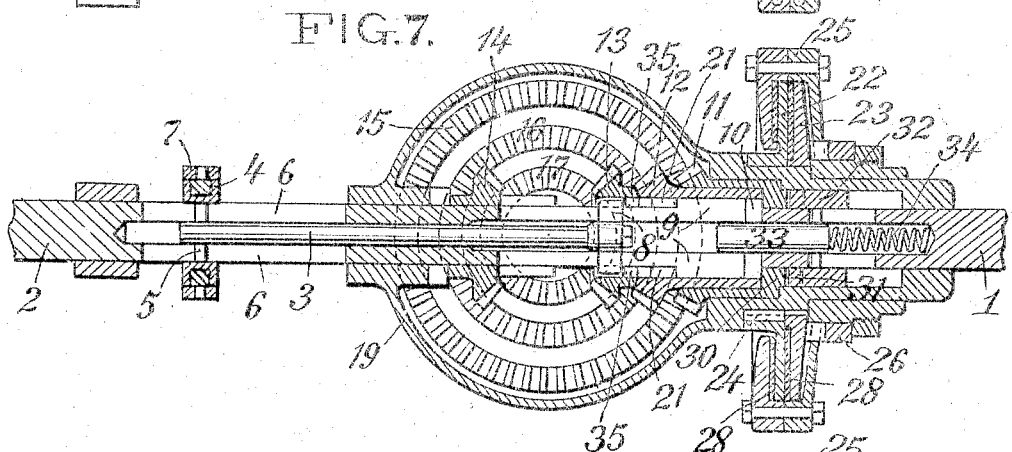
Figure 8:
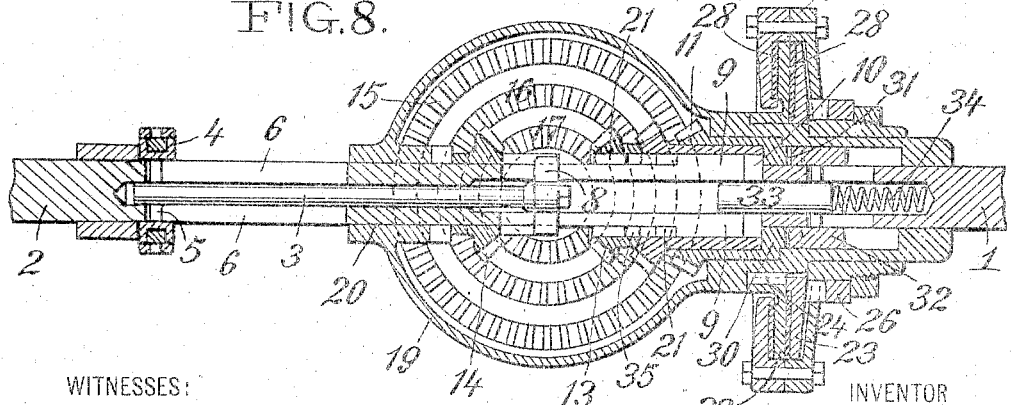

In the drawings: Figure 1—is a longitudinal section of the gearing, showing the driving and driven shafts disconnected, the view being taken on the line $s^1$, $s^1$, of Fig. 3. Fig. 2—is a sectional view, taken at right angles to the plane of Fig. 1, showing the shafts coupled direct for high speed transmission. Fig. 3—is a cross-section on the line $S^3$, $S^3$, of Fig. 2. Fig. 4—is a similar view taken on the line $S^4$, $S^4$, of Fig. 2. Fig. 5—is a detail cross-sectional view taken on the line $S^5$, $S^5$, of Fig. 1. Fig. 6—is a longitudinal section showing the gearing adjusted for transmission from the driving to the driven shaft in the same direction, at a speed reduction of 2 to 1. Fig. 7—is a similar view at right angles to the plane of Fig. 6, showing a further adjustment for transmission from the driving to the driven shaft in the same direction, at a speed reduction of 4 to 1, and Fig. 8—shows the final adjustment to reverse the direction of rotation of the driven shaft, the speed reduction being 4 to 1, as in Fig. 7.

In the gearing shown, the driving and driven shafts may be rotated either independently or in coupled relation, in the same direction or in opposite directions, and at the same speed or at different speeds, as desired.

In the present embodiment of the invention, the speed of rotation of the driving shaft is the highest speed transmitted, and when, therefore, the driven shaft is to be rotated at such speed, it is coupled direct. For the transmission of any speed below that of the driving shaft, reducing gears are employed; but it will be understood that this particular arrangement is designed to serve herein for purposes of illustration only, as it will be obvious from the following description, that the substitution of multiplying or other gears for the reducing gears could be readily effected without departing from the principle of operation involved.

Referring now to the drawings: 1 represents the driving shaft, and 2 the driven shaft. These shafts mounted in any approved manner are arranged end to end and the driven shaft is bored out to receive a rod, 3, which is movable back and forth by means of a sliding collar, 4, upon the shaft. The collar is secured to the rod by pin 5, pressing through a slot, 6, in the shaft, and is grooved in the usual manner to coöperate with the forked end of a lever, 7, or other device by which its movement is controlled. For the direct coupling of the shafts, the rod has secured to its end, opposite that to which the sliding collar is attached, a cross-pin, 8, which projects through oppositely disposed slots, 9, in the driven shaft, and is movable in and out of locked relation with notches, 10, formed in the adjoining end of the driving shaft.

In Fig. 1, the cross-pin 8 is shown as lying wholly within the slots 9, and the shafts being thus disconnected, may be rotated at different speeds, permitting transmission from one to the other through the gearing in a manner to be later on explained.

In Fig. 2, the shafts are shown coupled by the cross-pin 8 for direct transmission, the pin being centered relatively to the line of their abutting ends and engaging the registering slots and notches therein. It will thus be seen that a full movement of the rod toward the right, as in Fig. 2, serves to connect the shafts for high speed transmission, and a reverse movement of the rod disconnects them, permitting independent rotation thereof.

When the driven shaft is to be rotated in either direction at a lower speed than that of the driving shaft, transmission, as above stated, is effected through reducing gears, which will now be described.

Mounted upon the shaft 1 there is a gear, 11, which will hereinafter be termed the driving gear, and loosely mounted upon the shaft 2 there are three or more gears, 12, 13, and 14, which will be hereinafter termed the driven gears. These gears, 11, 12, 13, 14, are shown connected by reducing gears, 15, 16, 17, two sets of which are preferably employed, as shown, to equalize the strain and give greater strength, etc., but so far as the transmission of power is concerned, one set only is required.

The gears 15, 16, and 17 of each set are secured together and turn loosely upon a pin or stud, 18, projecting inwardly from the gear casing, 19. The casing 19 is preferably formed in sections in the usual manner, and has terminal bearings, 20, upon each of the shafts about which it is free to turn.

With the parts adjusted as in Fig. 1, rotation of the shaft 1, carrying the driving gear 11, will give motion through the gears 15, 16, and 17 to the driven gears 12, 13, and 14, causing the gears 12 and 13 to turn in one direction and the gear 14 in the opposite direction. In order now that such motion may be transmitted to the driven shaft, each of the gears 12, 13, and 14 is provided with oppositely disposed keyways, 21, with which the projecting ends of the cross-pin 8 are brought into engagement by movement of the rod 3, the effect of which is to lock the gear thus engaged, in driving relation with the driven shaft.

In Fig. 1 the position of the rod 3 is such that the cross-pin is shifted clear of the gears 12, 13, and 14, and thus adjusted, motion is transmitted from the driving shaft, through gear 11, reducing gears 15, 16, and 17, to the driven gears 12, 13, and 14, but no motion is transmitted to the driven shaft 2. If now, the rod 3 is shifted toward the left, until the cross-pin 8 enters the keyways of either the gear 12, as in Fig. 6, or the gear 13, as in Fig. 7, the shaft 2 will be coupled in driving relation with one or the other of these gears and will therefore rotate at a speed reduction of either 2 to 1 or 4 to 1, depending upon which of the gears is engaged. It will also be seen that the further shifting of the rod 3 toward the left until the cross-pin carried thereby interlocks with the gear 14, as in Fig. 8, will result in coupling the shaft 2 in driving relation and giving it motion in a reverse direction at a speed reduction of 4 to 1.

When motion is transmitted through one of the gears 12, 13, and 14, as just described, any load upon the driven shaft in excess of the total resistance offered by the weight and friction of the engaging parts of the gearing, will oppose rotation of this shaft, and unless checked, the tendency would be for the gear casing and reducing gears mounted therein to revolve about the driven gears, and the driven shaft to come to rest.

In order to counter-balance the load upon the driven shaft, a suitable friction device is employed, comprising two members, 22, 23, one of which is keyed to the gear casing, as indicated at 24, in Fig. 7, and the other mounted free to turn thereon. These members are inclosed in a sectional non-rotatable casing, 25, and are moved in and out of effective engagement by means of a cam, 26, which coöperates with studs, 27, of the loose member of the friction device, such studs projecting through openings in the side of the casing, as shown in Figs. 5 and 6. One or both members of the friction device may be faced with fiber, leather, or other material, as indicated at 28. The cam 26 may be given requisite motion through any suitable lever connection, 29, to throw the friction on or off and thus hold the gear casing from rotation or permit rotation thereof at any speed desired. A controlling device is thus provided, which is effective at all times, to vary the speed of the driven shaft without requiring a readjustment of the gears.

Assuming, for example, that the shaft 2 is being driven in the same direction as the driving shaft, at a 4 to 1 reduction in speed, as indicated in Fig. 7, if, now, for any reason it is desired to further reduce the speed of the shaft, the cam is rotated toward the left through the lever connection above referred to, permitting more or less slip between the members of the friction device, and thereupon the gear casing and reducing gears carried thereby begin to revolve about the driven gear 13, which results in a reduction in the speed of the driven shaft. This movement of the cam may be continued until the speed of the rotation of the gear casing equals that of the gear 11, and as there would then be no transmission of power to the driven shaft, the latter would cease to rotate. Obviously, therefore, by shifting the cam, first in one direction, then in the other, any desired change in the speed of the driven shaft may be obtained, and upon again throwing on the friction, the gearing will become effective and the shaft will resume its rotation at a 4 to 1 reduction in speed for which it was assumed to be set.

Referring now to Fig. 2: when the shafts, as shown, are coupled direct for the high speed transmission, it is desirable that the driving gear 11 should run free, as otherwise there would be motion throughout the entire train of gears, which would run idly at high speed without performing any useful function. In order, therefore, that the gear 11 may be disconnected at such times from the driving shaft, it is loosely mounted thereon and its hub, 30, is notched, as indicated at 31, to coöperate with a sliding clutch sleeve, 32, which is mounted upon the driving shaft and secured to a pin, 33, spring seated in the socketed end of the shaft. As arranged, the spring, 34, acts to advance the clutch and lock the gear in driving relation upon the shaft, and disengagement thereof is effected by the rod 3, which, when shifted to the limit of its movement toward the right, strikes the projecting end of the pin 33 and moves the same in opposition to the spring until the sliding clutch sleeve 32 is clear of the gear. With the gear thus disengaged and the friction thrown in, the shafts will be coupled direct, as in Fig. 2, for high speed transmission without motion either in the gearing or the gear casing.

For convenience in connecting and disconnecting the driving gears 11 and 12, the adjoining faces thereof are counter bored, as indicated at 35, and such counter bored portions combine to form an annular groove of suitable size to receive the cross-pin 8, which when lying therein may, by a slight movement of the rod 3, be caused to lock either of the gears in driving relation upon the shaft. The same result is obtained when the cross-pin is shifted to a point between the face of the gear 12 and the hub of the gear 13.

It will be observed that the various adjustments above described are made without disengaging the gears; also that the speed and direction of rotation of the driven shaft is at all times under complete control.

The operation, advantages, etc. of my invention will be apparent from the foregoing description.

Having thus described my invention, I claim:

1. A power transmitter comprising a driving member, a driven member, a plurality of gears interposed between the members, a selective clutch device controlling direct transmission from one member to the other and the disconnection of the gears from both members and indirect transmission through the gears, and means for varying the relative speed of the gears.

2. A power transmitter comprising a driving member, a driven member, a plurality of gears interposed between the members, a selective clutch device controlling direct transmission from one member to the other and the disconnection of the gears from both members and indirect transmission through the several gears, and means independent of the driving member for varying the relative speed of the gears.

3. A power transmitter comprising a driving member, a driven member, gears interposed between the members and permanently arranged in intermeshing relation, a selective clutch device controlling direct transmission from one member to the other and the disconnection of the gears from both members and indirect transmission through the gears, and means independent of the driving member for varying the relative speed of the gears.

4. A power transmitter comprising a driving member, a driven member, a train of gears interposed between the members comprising a planetary gear, a selective clutch device controlling direct transmission from one member to the other and the disconnection of the gears from both members and indirect transmission through the train, and means for varying the effective speed of rotation of the planetary gear.

5. A power transmitter comprising a driving member, a driven member, gears interposed between the members comprising planetary gears, a selective clutch device controlling direct transmission from one member to the other and the disconnection of the gears from both members and indirect transmission through the several gears, and means common to the several planetary gears for varying the effective speed of rotation thereof.

6. A power transmitter comprising a driving member, a driven member, a train of gears interposed between the members, clutches coöperating with the terminal gears of the train to connect or disconnect them from the members, operating means common to the several clutches, and independent means for controlling transmission through the train.

7. A power transmitter comprising a driving member, a driven member, a train of gears interposed between the members, auxiliary gears coöperating therewith clutches selectively operating to connect said driven member with one of the auxiliary gears and directly with said driving member, and operating means common to the several clutches.

8. A power transmitter comprising a driving member, a driven member, gearing interposed between the members, certain of the gears being movable in planetary relation to the members, a selective clutch device controlling direct transmission from one member to the other and indirect transmission at different speeds through the gearing, and means for frictionally controlling the movement of the planetary gears.

9. A power transmitter comprising a driving member, a driven member, gearing interposed between the members, a rotatable casing in which certain of the gears are mounted, and means for disconnecting the gears and for effecting transmission from one member to the other.

10. A power transmitter comprising a driving member, a driven member, gearing interposed between the members, a rotatable casing in which certain of the gears are mounted, means for offering varying resistance to movement of the casing, and means for disconnecting said gearing and for effecting transmission from one member to the other.

11. A power transmitter comprising a driving member, a driven member, gearing interposed between the members, a rotatable casing in which certain of the gears are mounted, and a selective clutch device for controlling indirect transmission through said gearing and disconnecting said gearing for direct transmission from one member to the other.

12. A power transmitter comprising a driving member, a driven member, gearing interposed between the members, a rotatable casing in which certain of the gears are mounted, means for offering varying resistance to movement of the casing, and a selective clutch device for controlling indirect transmission through said gearing and for disconnecting said gearing for direct transmission from one member to the other.

13. A power transmitter comprising a driving member, a driven member, changeable speed gearing interposed between the members, a rotatable casing in which certain of the gears are mounted in planetary relation to the members, a selective clutch device controlling the connection between the planetary gearing and the members, and means for controlling rotation of the casing.

14. A power transmitter comprising a driving member, a driven member, changeable speed gearing interposed between the members, a rotatable casing in which certain of the gears are mounted and movable therewith in planetary relation to the members, a selective clutch device controlling the connection between the planetary gearing and the members, and means for frictionally controlling rotation of the casing.

15. A power transmitter comprising a driving member, a driven member, gearing interposed between the members, a rotatable casing in which certain of the gears are mounted and movable in planetary relation to the members, a variable resistance device coöperating with the casing, and a selective clutch device controlling direct transmission from one member to the other and indirect transmission at different speeds through the gearing.

16. A power transmitter comprising a driving member, a driving gear thereon, a driven member, trains of gears interposed between said driving member gear and the driven member, each train terminating in a gear loose upon said driven member, a clutch device for selectively controlling said loose gears and effecting direct connection between said members independently of said gears, a rotatable casing having certain of the gears mounted therein and movable therewith, and means for controlling rotation of the casing.

17. A power transmitter comprising a driving member, a driven member, gearing interposed between the members, a rotatable casing in which certain of the gears are mounted, and means of effecting transmission from one member to the other and for disconnecting said gearing from the driving member.

18. A power transmitter comprising a driving member, a driven member, mechanism for transmitting motion from the driving member to rotate the driven member at different speeds in other directions, said means including planetary gears whose effective speed of rotation is variable, and means for directly connecting the members and disconnecting said mechanism from the driving member.

In testimony whereof, I affix my signature, in the presence of two witnesses.

ARTHUR JACOB MORSE.

Witnesses:
W. H. PUMPHREY,
CHARLES D. GREEN.